(12) United States Patent
Duesler et al.

(10) Patent No.: US 10,151,247 B2
(45) Date of Patent: Dec. 11, 2018

(54) HEAT EXCHANGER SUSPENSION SYSTEM WITH PIPE-TO-LINKAGE SPRING RATE RATIO

(71) Applicant: UNITED TECHNOLOGIES CORPORATION, Hartford, CT (US)

(72) Inventors: Paul W. Duesler, Manchester, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 376 days.

(21) Appl. No.: 15/074,829

(22) Filed: Mar. 18, 2016

(65) Prior Publication Data

US 2017/0268426 A1 Sep. 21, 2017

(51) Int. Cl.
*F02C 7/32* (2006.01)
*F28D 7/06* (2006.01)
(Continued)

(52) U.S. Cl.
CPC ............. *F02C 7/32* (2013.01); *F02C 6/08* (2013.01); *F02C 7/141* (2013.01); *F02C 7/185* (2013.01); *F02K 3/115* (2013.01); *F04D 29/5826* (2013.01); *F28D 7/06* (2013.01); *F28F 9/002* (2013.01); *F28F 9/0246* (2013.01); *F05D 2260/213* (2013.01); *F05D 2300/175* (2013.01);
(Continued)

(58) Field of Classification Search
CPC .... F02C 7/32; F02C 7/185; F02C 6/08; F02C 7/141; F28F 9/002; F28F 9/0246; F28F 2280/00; F28F 2255/02; F02K 3/115; F04D 29/5826; F05D 2300/175; F05D 2260/213; F28D 7/06; F28D 2021/0026
See application file for complete search history.

(56) References Cited

U.S. PATENT DOCUMENTS 2,608,054 A * 8/1952 Price .................... B64C 21/025
290/4 C
3,528,250 A * 9/1970 Johnson .................. F02C 7/185
60/262
(Continued)

FOREIGN PATENT DOCUMENTS

WO     2014159505     10/2014

OTHER PUBLICATIONS

EP Search Report dated Oct. 19, 2017 in EP Application No. 17151865.7.

*Primary Examiner* — Claire Rojohn, III
(74) *Attorney, Agent, or Firm* — Snell & Wilmer L.L.P.

(57) ABSTRACT

A heat exchanger (HEX) arrangement for cooling air in a gas turbine engine is provided. The HEX arrangement may include a heat exchanger coupled to a plurality of ducts comprising a hot-side inlet duct and a hot-side outlet duct. The hot-side outlet duct may be in fluid communication with a compressor section of the gas turbine engine and in mechanical communication with a diffuser case. The HEX arrangement may further include a plurality of supporting links coupled between the heat exchanger and the gas turbine engine for securing the heat exchanger relative to the gas turbine engine. The supporting links may comprise a statically determined system. A spring rate ratio of between 1% and 30% may exist between the plurality of ducts and the plurality of supporting links.

8 Claims, 10 Drawing Sheets

(51) Int. Cl.
*F02K 3/115* (2006.01)
*F02C 6/08* (2006.01)
*F02C 7/141* (2006.01)
*F02C 7/18* (2006.01)
*F04D 29/58* (2006.01)
*F28F 9/00* (2006.01)
*F28F 9/02* (2006.01)
*F28D 21/00* (2006.01)

(52) U.S. Cl.
CPC .. *F28D 2021/0026* (2013.01); *F28F 2255/02* (2013.01); *F28F 2265/26* (2013.01); *F28F 2280/00* (2013.01)

(56) References Cited

U.S. PATENT DOCUMENTS

| | | | | |
|---|---|---|---|---|
| 3,968,834 A * | 7/1976 | Mangus | F02C 7/08 | 165/82 |
| 4,090,358 A * | 5/1978 | Young | F02C 7/08 | 165/81 |
| 4,137,705 A * | 2/1979 | Andersen | F02C 7/14 | 60/39.08 |
| 4,556,486 A * | 12/1985 | Merket | B01D 29/00 | 210/170.09 |
| 4,697,633 A * | 10/1987 | Darragh | F28D 9/00 | 165/166 |
| 4,735,775 A * | 4/1988 | Leonard | A61M 5/44 | 128/DIG. 3 |
| 4,750,327 A * | 6/1988 | Wohrl | F02C 7/08 | 60/39.511 |
| 5,065,816 A * | 11/1991 | Darragh | F28D 9/0018 | 165/125 |
| 5,123,242 A * | 6/1992 | Miller | F02C 7/14 | 165/300 |
| 5,243,815 A * | 9/1993 | Maier | F02C 7/08 | 60/39.54 |
| 5,495,714 A * | 3/1996 | Gros | F01K 11/02 | 165/102 |
| 5,729,969 A * | 3/1998 | Porte | F02C 6/08 | 60/226.1 |
| 5,765,366 A * | 6/1998 | Beeck | F02C 7/222 | 239/431 |
| 5,775,412 A * | 7/1998 | Montestruc, III | F28D 9/0037 | 165/134.1 |
| 5,782,077 A * | 7/1998 | Porte | F02C 6/08 | 165/154 |
| 6,574,950 B2 * | 6/2003 | Nash | F02C 7/08 | 165/4 |
| 6,601,392 B2 * | 8/2003 | Child | F01D 25/28 | 60/39.511 |
| 6,983,787 B2 * | 1/2006 | Schoenenborn | F02C 6/18 | 165/10 |
| 7,861,512 B2 * | 1/2011 | Olver | F02C 7/14 | 60/226.1 |
| 8,266,888 B2 * | 9/2012 | Liu | F02C 6/08 | 60/226.1 |
| 8,266,889 B2 * | 9/2012 | Coffinberry | F01D 25/125 | 60/226.1 |
| 8,656,894 B2 * | 2/2014 | Leroux | F02B 29/0418 | 123/188.14 |
| 8,708,036 B2 * | 4/2014 | Ikeda | F02B 29/0462 | 165/157 |
| 8,813,500 B2 * | 8/2014 | Maier | F01D 25/28 | 165/67 |
| 8,826,970 B2 * | 9/2014 | Shiraichi | F28F 1/32 | 165/151 |
| 9,249,730 B2 * | 2/2016 | Bourassa | F02C 7/185 | |
| 9,346,541 B2 * | 5/2016 | Honnorat | B64C 27/473 | |
| 9,458,855 B2 * | 10/2016 | Dierksmeier | F01D 11/24 | |
| 9,556,905 B2 * | 1/2017 | Gibson, Jr. | F16C 33/20 | |
| 9,777,963 B2 * | 10/2017 | Martinez | B23P 15/26 | |
| 2002/0005275 A1 * | 1/2002 | O'Donnell | F24H 9/0026 | 165/109.1 |
| 2004/0223846 A1 * | 11/2004 | Taylor | F01D 11/14 | 415/200 |
| 2005/0141989 A1 * | 6/2005 | Sayegh | F01D 9/04 | 415/116 |
| 2005/0150970 A1 * | 7/2005 | Beutin | F02C 7/141 | 237/12 |
| 2008/0095611 A1 * | 4/2008 | Storage | F01D 25/125 | 415/116 |
| 2013/0020047 A1 * | 1/2013 | Army, Jr. | F28F 21/086 | 165/41 |
| 2013/0180696 A1 * | 7/2013 | Magee | F28F 1/00 | 165/175 |
| 2014/0027099 A1 * | 1/2014 | Sispera | F28F 1/00 | 165/177 |
| 2014/0208768 A1 * | 7/2014 | Bacic | F01D 5/082 | 60/782 |
| 2015/0047315 A1 * | 2/2015 | Snyder | F02C 7/18 | 60/204 |
| 2015/0101334 A1 * | 4/2015 | Bond | F28F 9/013 | 60/728 |
| 2015/0285090 A1 * | 10/2015 | Munsell | F01D 15/12 | 415/1 |
| 2016/0245170 A1 * | 8/2016 | Lamarre | F01C 11/008 | |

\* cited by examiner

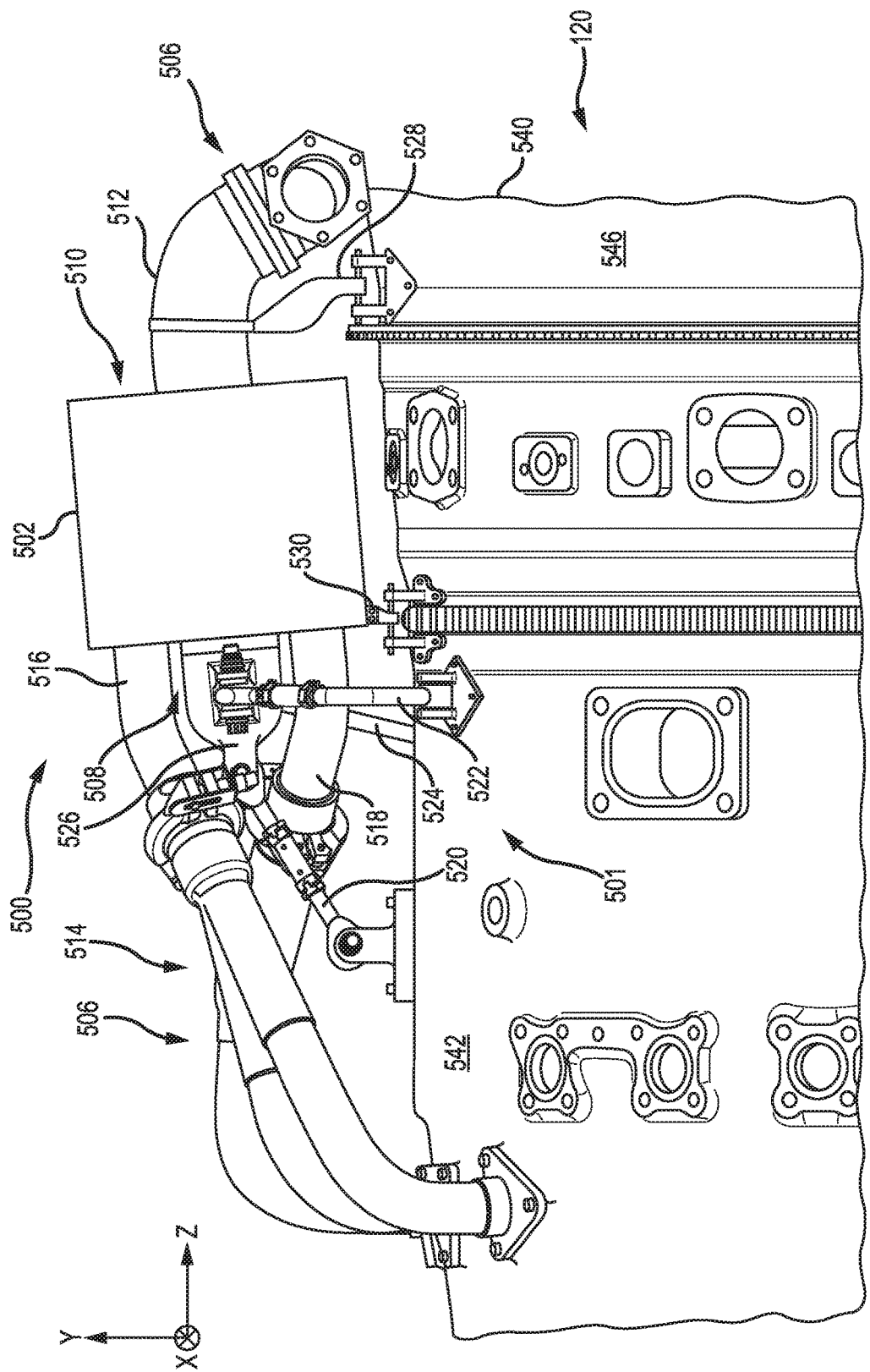

HEAT EXCHANGER SUSPENSION SYSTEM WITH PIPE-TO-LINKAGE SPRING RATE RATIO

This disclosure was made with government support under contract No. FA8650-09-D-2923-AETD issued by the Department of the Air Force. The government has certain rights in the disclosure.

FIELD

The present disclosure relates to gas turbine engines, and, more specifically, to heat exchangers (HEX) for cooling air of gas turbine engines.

BACKGROUND

As higher pressures are achieved in compressors of gas turbine engines, the temperature of compressed air in and/or leaving the compressors may increase as well. As a result, various components in a gas turbine engine may experience thermal stress. Thus, a heat exchanger (HEX) may be provided to cool hot air in a gas turbine engine. A heat exchanger may experience various loads between mounting systems and pipes for routing air.

SUMMARY

A heat exchanger for cooling air in a gas turbine engine may comprise a plurality of ducts comprising a hot-side inlet duct and a hot-side outlet duct in fluid communication with a compressor section of the gas turbine engine and in mechanical communication with a diffuser case. The heat exchanger may further comprise a plurality of supporting links coupled between the heat exchanger and an engine case for securing the heat exchanger relative to the gas turbine engine, wherein a spring rate ratio between the plurality of ducts and the plurality of supporting links is between 1% and 30%.

In various embodiments, the hot-side outlet duct may be directly coupled to the diffuser case. The heat exchanger may comprise a first attachment feature, the plurality of supporting links comprising a first link coupled to the first attachment feature, a second link coupled to the first attachment feature, and a third link coupled to the first attachment feature. The first link may extend substantially in an axial direction, a first end of the first link coupled to the diffuser case and a second end of the first link coupled to the first attachment feature, wherein the first end of the first link is substantially prevented from moving in a radial direction and prevented from moving in the axial direction. The second link may extend substantially in a circumferential direction, a first end of the second link coupled to the diffuser case and a second end of the second link coupled to the first attachment feature, wherein the first end of the second link is substantially prevented from moving in a radial direction and is substantially prevented from moving in the circumferential direction, with respect to the diffuser case. The third link may extend substantially in the circumferential direction, a first end of the third link coupled to the diffuser case and a second end of the third link coupled to the first attachment feature, wherein the first end of the third link is substantially prevented from moving in the radial direction and is substantially prevented from moving in the circumferential direction, with respect to the diffuser case. The first attachment feature may be substantially prevented from moving in the axial direction and in the radial direction, with respect to the diffuser case. The first attachment feature may be substantially prevented from moving in the radial direction and in the circumferential direction, with respect to the diffuser case. The heat exchanger may comprise a second attachment feature, the second attachment feature coupled to the gas turbine engine, the second attachment feature substantially prevented from moving in a circumferential direction with respect to the gas turbine engine. The second attachment feature may be coupled to the gas turbine engine via a mounting bracket coupled directly to an engine case. The heat exchanger may comprise a third attachment feature coupled to the gas turbine engine and a fourth attachment feature coupled to the gas turbine engine, wherein the third attachment feature is substantially prevented from moving in a radial direction and the fourth attachment feature is substantially prevented from moving in the radial direction. The third attachment feature may be coupled to the gas turbine engine via a fifth mounting bracket coupled directly to the diffuser case and the fourth attachment feature may be coupled to the gas turbine engine via a sixth mounting bracket coupled directly to the diffuser case. The heat exchanger may comprise a cold-side inlet and a cold-side outlet through which fan bypass air is conducted.

A heat exchanger arrangement for a gas turbine engine may comprise a heat exchanger, a plurality of pipes comprising a plurality of inlet pipes comprising a hot-side inlet and a plurality of outlet pipes comprising a hot-side outlet, a cold-side inlet, a cold-side outlet, the cold-side inlet and the cold-side outlet being for conducting a cooling air in a fan bypass flow path to transfer heat from air in the heat exchanger to the cooling air, and a statically determined six degrees of freedom mounting system comprising a plurality of links coupled to the heat exchanger and coupled directly to a diffuser case.

In various embodiments, the plurality of links may comprise single vector load paths, wherein the plurality of links is configured to transfer loads only under at least one of compression or tension. A spring rate ratio between the plurality of pipes and the statically determined six degree of freedom mounting system may comprise between 1% and 30%. The spring rate ratio between the plurality of pipes and the statically determined six degree of freedom mounting system may comprise between 5% and 15%. At least a portion of the heat exchanger may be located directly radially outward from the diffuser case and axially in line with the diffuser case.

A heat exchanger arrangement for a gas turbine engine may comprise a heat exchanger, wherein at least a portion of the heat exchanger is coupled directly to a diffuser case, located radially outward from the diffuser case, and located axially in line with the diffuser case, a plurality of pipes comprising, a plurality of inlet pipes comprising a hot-side inlet, and a plurality of outlet pipes comprising a hot-side outlet, wherein the plurality of outlet pipes are coupled directly to the diffuser case for conducting cooled air into at least one hollow strut extending through a diffuser case plenum.

In various embodiments, the plurality of inlet pipes may be directly coupled to the diffuser case for receiving air from the diffuser case plenum. At least a portion of the heat exchanger may be located axially in line with a combustor.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 5 illustrates a perspective view of a heat exchanger installed on a gas turbine engine, in accordance with various embodiments;

DETAILED DESCRIPTION

Figure 1:
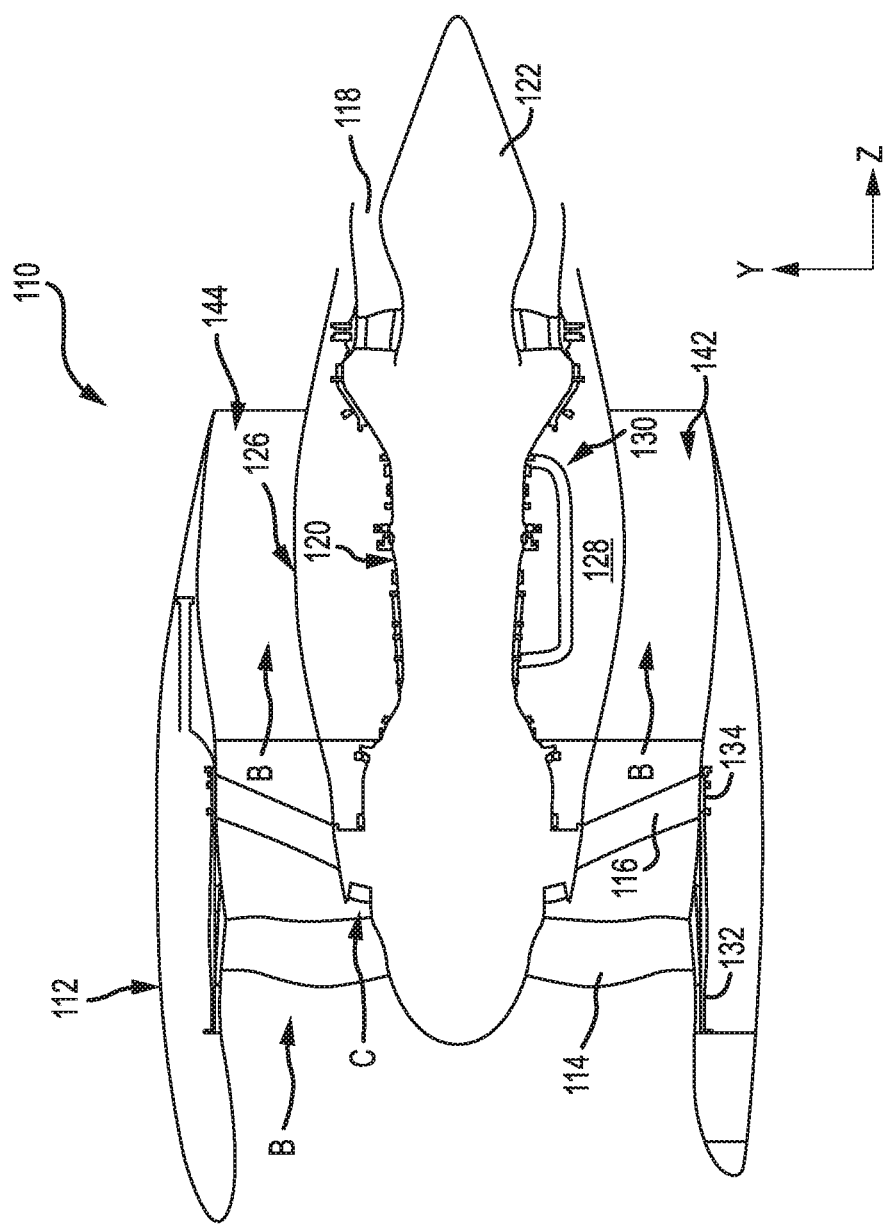
FIG. 1 illustrates a cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "gas" and "air" may be used interchangeably.

Fuel efficiency of gas turbine engines is known to be proportional to the ratio of the exit pressure and the inlet pressure of the engine, or overall pressure ratio (OPR). As the OPR increases, the efficiency of the engine generally increases. However, a byproduct of OPR is high operating temperatures in various portions of the engine, such as the high pressure compressor for example. Materials used in gas turbine engines have temperature thresholds which cannot be surpassed for successful operation. Cooling air may be used to decrease operating temperatures of various components in a gas turbine engine. Generally, air from a compressor section of a gas turbine engine is used to cool other sections of the engine. However, as the OPR of gas turbine engines increases, the air from the compressor section may become increasingly hot. A heat exchanger (HEX) may be used to cool the air from a compressor section, thus providing cooled cooling air.

A heat exchanger for a gas turbine engine may be coupled to an engine case via a mounting system comprising links and via pipes or ducts for routing air for cooling. The mounting system may comprise a statically determined mounting system. The pipes may comprise a stiffness. The pipes may include bends in the pipes which may decrease their stiffness. The links may comprise a stiffness. The links may each comprise single vector load carriers. The stiffness ratio, or the spring rate ratio between the pipes and the links may be between one percent and thirty percent.

With reference to FIG. 1, a schematic view of a gas turbine engine is illustrated, in accordance with various embodiments. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112.

Figure 2:
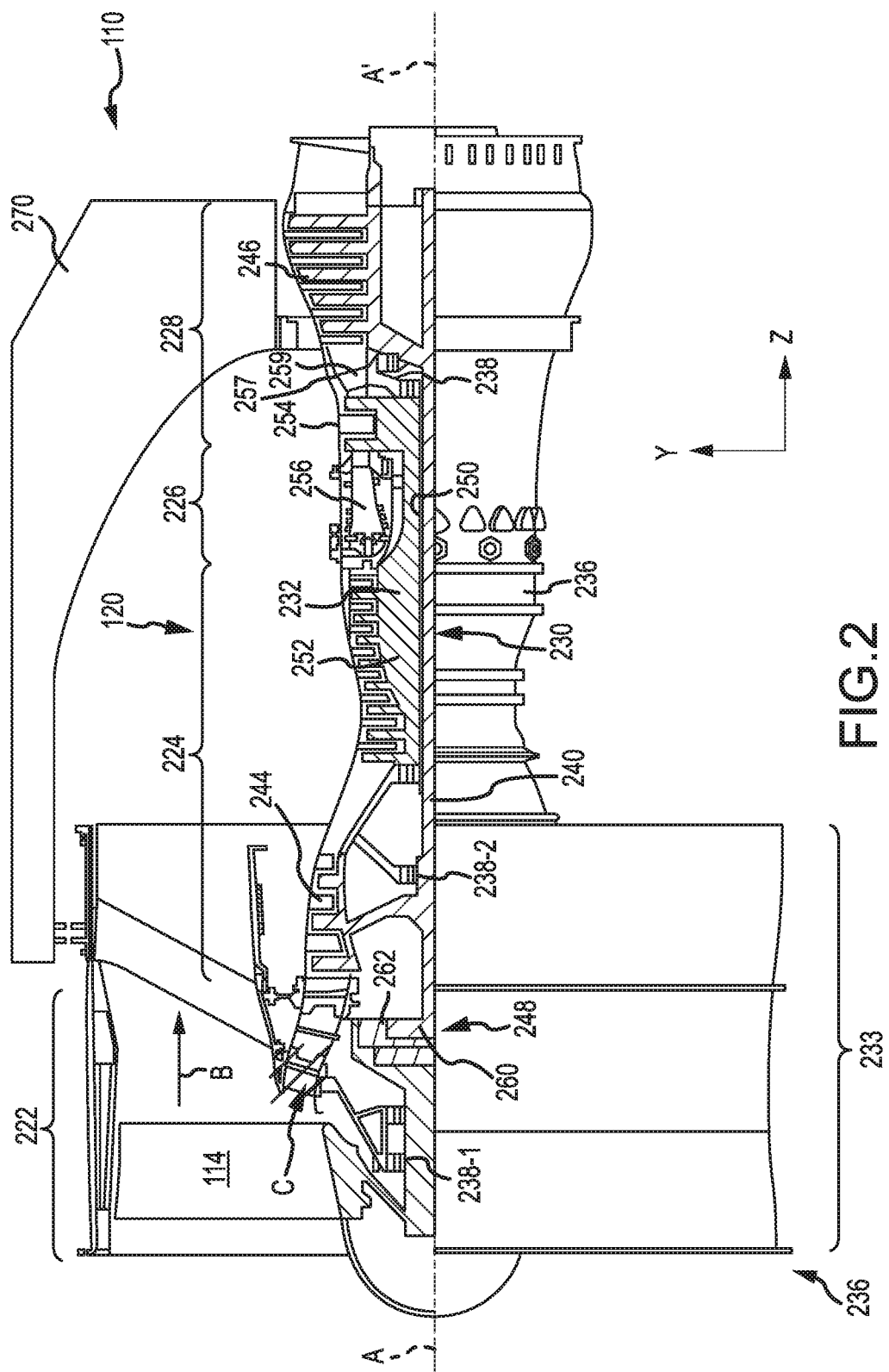
FIG. 2 illustrates a cross-sectional view of an exemplary gas turbine engine, in accordance with various embodiments.

With momentary additional reference to FIG. 2, nacelle 112 typically comprises two halves which are typically mounted to pylon 270. Fan case structure 233 may provide structure for securing gas turbine engine 110 to a pylon 160. According to various embodiments, multiple guide vanes 116 may extend radially between core engine 120 and intermediate case IMC 134.

Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or a compressed air duct 130, for example. Compressed air duct 130 may be under high pressure and may supply compressed cooling air from a compressor stage to a high pressure turbine stage, for example. In various embodiments, a heat exchanger may be coupled to compressed air duct 130.

With respect to FIG. 2, elements with like element numbering as depicted in FIG. 1 are intended to be the same and will not necessarily be repeated for the sake of clarity.

In various embodiments and with reference to FIG. 2, a gas turbine engine 110 is provided. Gas turbine engine 110 may be a two-spool turbofan that generally incorporates a fan section 222, a compressor section 224, a combustor section 226 and a turbine section 228.

Alternative engines may include, for example, an augmentor section among other systems or features. In operation, fan section 222 can drive air along a bypass flow-path B while compressor section 224 can drive air along a core flow-path C for compression and communication into combustor section 226 then expansion through turbine section 228. Although depicted as a turbofan gas turbine engine 110 herein, it should be understood that the concepts described herein are not limited to use with two-spool turbofans as the teachings may be applied to other types of turbine engines including three-spool architectures.

Gas turbine engine 110 may generally comprise a low speed spool 230 and a high speed spool 232 mounted for rotation about an engine central longitudinal axis A-A' relative to an engine static structure 236 via one or more bearing systems 238 (shown as bearing system 238-1 and bearing system 238-2 in FIG. 2). It should be understood that various bearing systems 238 at various locations may alternatively or additionally be provided including, for example, bearing system 238, bearing system 238-1, and bearing system 238-2.

Low speed spool 230 may generally comprise an inner shaft 240 that interconnects a fan 114, a low pressure (or first) compressor section 244 and a low pressure (or first) turbine section 246. Inner shaft 240 may be connected to fan 114 through a geared architecture 248 that can drive fan 114 at a lower speed than low speed spool 230. Geared architecture 248 may comprise a gear assembly 260 enclosed within a gear housing 262. Gear assembly 260 couples inner shaft 240 to a rotating fan structure. High speed spool 232 may comprise an outer shaft 250 that interconnects a high-pressure compressor ("HPC") 252 (e.g., a second compressor section) and high pressure (or second) turbine section 254. A combustor 256 may be located between HPC 252 and high pressure turbine 254. A mid-turbine frame 257 of engine static structure 236 may be located generally between high pressure turbine 254 and low pressure turbine 246. Mid-turbine frame 257 may support one or more bearing systems 238 in turbine section 228. Inner shaft 240 and outer shaft 250 may be concentric and rotate via bearing systems 238 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 244 then HPC 252, mixed and burned with fuel in combustor 256, then expanded over high pressure turbine 254 and low pressure turbine 246. Mid-turbine frame 257 includes airfoils 259 which are in the core airflow path. Low pressure turbine 246 and high pressure turbine 254 rotationally drive the respective low speed spool 230 and high speed spool 232 in response to the expansion.

Gas turbine engine 110 may be, for example, a high-bypass geared aircraft engine. In various embodiments, the bypass ratio of gas turbine engine 110 may be greater than about six (6). In various embodiments, the bypass ratio of gas turbine engine 110 may be greater than ten (10). In various embodiments, geared architecture 248 may be an epicyclic gear train, such as a star gear system (sun gear in meshing engagement with a plurality of star gears supported by a carrier and in meshing engagement with a ring gear) or other gear system. Geared architecture 248 may have a gear reduction ratio of greater than about 2.3 and low pressure turbine 246 may have a pressure ratio that is greater than about 5. In various embodiments, the bypass ratio of gas turbine engine 110 is greater than about ten (10:1). In various embodiments, the diameter of fan 114 may be significantly larger than that of the low pressure compressor 244, and the low pressure turbine 246 may have a pressure ratio that is greater than about 5:1. Low pressure turbine 246 pressure ratio may be measured prior to inlet of low pressure turbine 246 as related to the pressure at the outlet of low pressure turbine 246 prior to an exhaust nozzle. It should be understood, however, that the above parameters are exemplary of various embodiments of a suitable geared architecture engine and that the present disclosure contemplates other gas turbine engines including direct drive turbofans. FIG. 1 and FIG. 2 provide a general understanding of the sections in a gas turbine engine, and are not intended to limit the disclosure. The present disclosure may extend to all types of turbine engines, including turbofan gas turbine engines and turbojet engines, for all types of applications.

Figure 3:
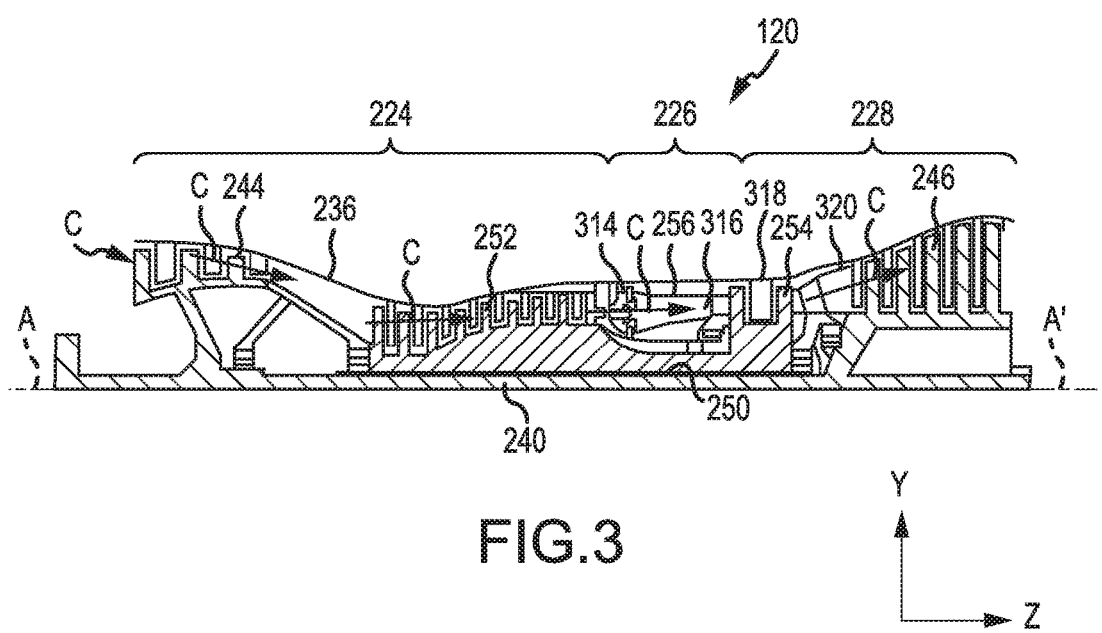
FIG. 3 illustrates the primary-flow gas path in a gas turbine engine through the low pressure compressor, high-pressure compressor, combustor, high-pressure turbine, and low-pressure turbine, in accordance with various embodiments.

With respect to FIG. 3, elements with like element numbering as depicted in FIG. 1 and FIG. 2 are intended to be the same and will not necessarily be repeated for the sake of clarity.

FIG. 3 illustrates the primary flow gas path through core engine 120, in accordance with various embodiments. Core engine 120 may include engine static structure 236, low-pressure compressor 244, high-pressure compressor 252, combustor 256, high-pressure turbine 254, and low-pressure turbine C. Engine static structure 236 may be referred to as an engine case. Gas may flow into low-pressure compressor 244 along gas path C. Gas flowing through low-pressure compressor 244 along gas path C may be compressed, resulting in an increase in pressure and temperature relative to the pressure and temperature upon entering low-pressure compressor 244. Gas may flow into high-pressure compressor 252 along gas path C. Gas flowing through high-pressure compressor 252 along gas path C may be compressed, resulting in an increase in pressure and temperature relative to the pressure and temperature upon entering high-pressure compressor 252. Uncombusted gas in gas path C leaving high-pressure compressor 252 may be referred to as T3 gas. T3 gas may have a varying temperature at different engine speeds. The temperature of T3 gas may be about 400° F. (205° C.) when core engine 120 is at idle speeds and may reach about 1,400° F. (760° C.) or higher as core engine 120 accelerates for takeoff, where the term "about" in this context only may refer to +/−200° F. Different engines may have higher temperatures or lower temperatures at each stage. T3 gas may be present at location 314 of core engine 120. T3 gas leaving the high-pressure compressor 252 may then flow into combustor 256 to supply combustor 256 with air for combustion.

In various embodiments, uncombusted T3 gas may be mixed with fuel and burned in combustor 256. Combusted gas in combustor 256 may be referred to as T4 gas. T4 gas may leave combustor 256 and enter high-pressure turbine 254. T4 gas may reach or exceed temperatures of up to 3,500° F. (1,925° C.) or higher. T4 gas may be located at location 316, for example. T4 gas leaving combustor may follow gas path C to drive high-pressure turbine 254.

In various embodiments, combusted gas that has entered, but not exited, high-pressure turbine 254 may be identified as T4.25 gas. T4.25 gas may be significantly cooler than T4 gas exiting combustor 256. For example, under operating conditions such as during flight, T4.25 gas may be at temperatures of about 1,000° F.-2,000° F. (537° C.-1,093° C.), where the term "about" in this context only may refer to +/−500° F. T4.25 gas may be located at location 318, for example. The T4.25 gas then follows out high-pressure turbine 254 and into low-pressure turbine 246 along gas path C.

In various embodiments, combusted gas exiting high-pressure turbine 254 and entering low-pressure turbine 246 may be referred to as T4.5 gas. T4.5 gas may be cooler than T4.25 gas found in the high-pressure compressor or T4 gas exiting the combustor. For example, T4.5 gas may be about 1,500° F. (815° C.) degrees at idle, where the term "about" in this context only may refer to +/−500° F. T4.5 gas may be located at location 320 in gas path C, for example. The T4.5 gas then follows gas path C into low-pressure turbine 246.

Figure 4:
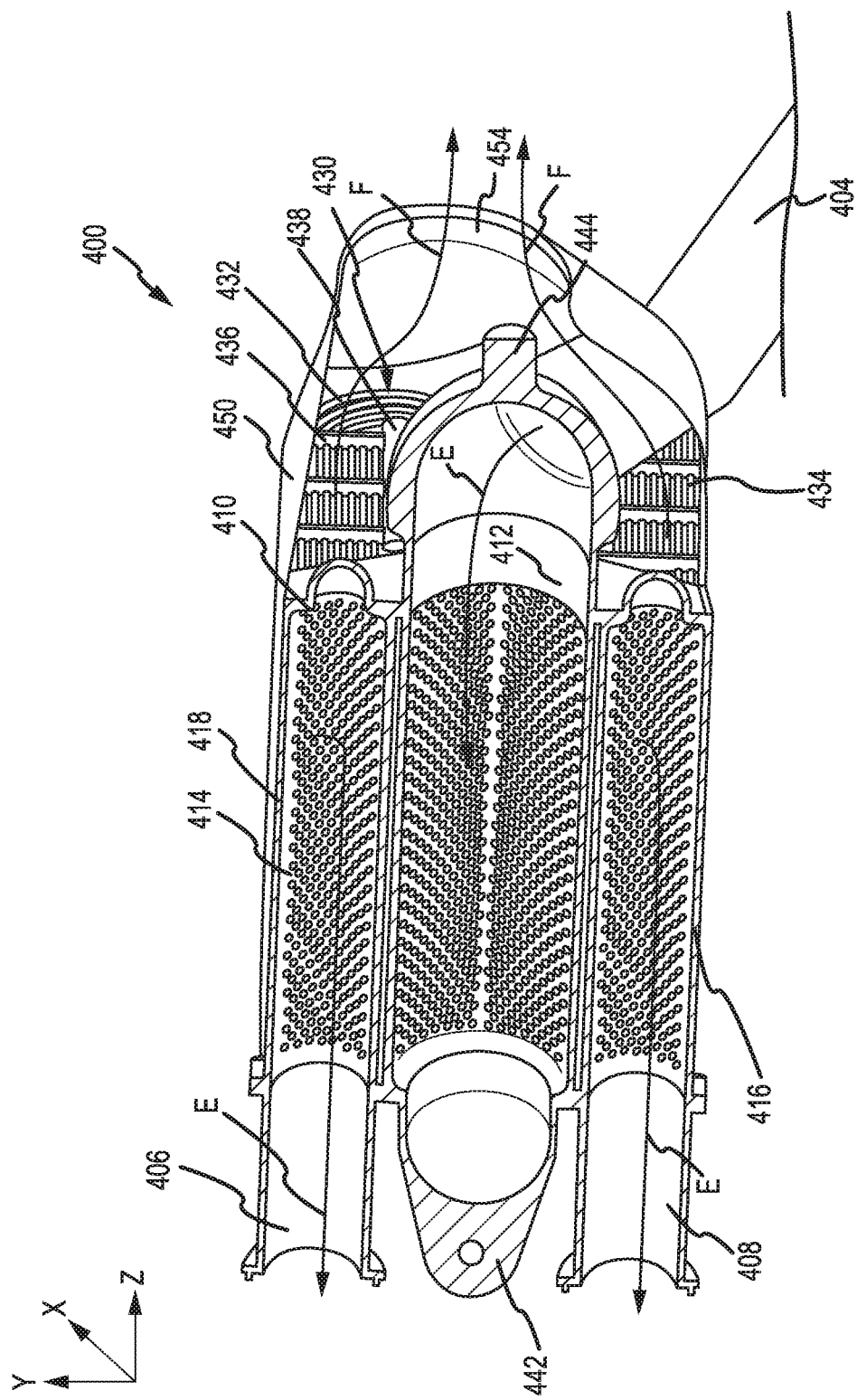
FIG. 4 illustrates a cross-sectional view of a heat exchanger, in accordance with various embodiments.

With reference to FIG. 4, a cross-sectional view of a heat exchanger (HEX) 400 is illustrated. An x-y-z axis is provided for ease of illustration. In various embodiments, HEX 400 may comprise a central manifold 410 and a plurality of tubes 430. In various embodiments, central manifold 410 may comprise an inlet portion 412, a first outlet portion 414, and a second outlet portion 416. In various embodiments, first outlet portion 414 may be located on the opposite side of inlet portion 412 as second outlet portion 416. In various embodiments, first outlet portion 414 may be located adjacent to inlet portion 412 (in the positive y-direction). In various embodiments, second outlet portion 416 may be located adjacent to inlet portion 412 (in the negative y-direction). In various embodiments, inlet portion 412, first outlet portion 414, and second outlet portion 416 may each individually define a cylindrical void. In various embodiments, HEX 400 may further comprise a shroud 450. In various embodiments, shroud 450 may be coupled to central manifold 410. Shroud 450 may at least partially encase central manifold 410 and tubes 430.

In various embodiments, a plurality of baffles, such as baffle 436 for example, may be coupled to plurality of tubes 430. Baffle 436 may comprise a plurality of apertures into which plurality of tubes 430 are inserted. Baffle 436 may add to the stiffness of plurality of tubes 430. In various embodiments, with momentary reference to FIG. 1, the number of baffles installed over plurality of tubes 430 may be determined by the highest operating frequency of gas turbine engine 110. For example, baffles, such as baffle 436 may be installed over plurality of tubes 430 until the natural frequency of plurality of tubes 430 is higher than the highest operating frequency of gas turbine engine 110. In various embodiments, a baffle support 438 may be coupled to baffle 436.

With reference now to FIG. 3 and FIG. 4, in various embodiments, central manifold 410 and/or plurality of tubes 430 may be made of a high performance nickel-chromium alloy such as an austenitic nickel-chromium-based superalloy (e.g., INCONEL or HAYNES 282), metals, ceramics, or other materials suitable to withstand T3 gas temperatures that may exceed 1,100° F. (593° C.) degrees when core engine 120 is operating at takeoff speeds.

With reference to FIG. 4, inlet portion 412 may include a first attachment feature 442 and a second attachment feature 444. In various embodiments, first attachment feature 442 may define a hemispherical void. In various embodiments, second attachment feature 444 may define a hemispherical void. In various embodiments, first attachment feature 442 may be detachably coupled to inlet portion 412. In various embodiments, first attachment feature 442 may be permanently coupled to inlet portion 412. For example, first attachment feature 442 may be welded, soldered, brazed, or otherwise suitably coupled to inlet portion 412. In various embodiments, second attachment feature 444 may be detachably coupled to inlet portion 412. In various embodiments, second attachment feature 444 may be permanently coupled to inlet portion 412. For example, second attachment feature 444 may be welded, soldered, brazed, or otherwise suitably coupled to inlet portion 412.

In various embodiments, air may enter HEX 400 via inlet pipe 404. In various embodiments, HEX 400 may be coupled via inlet pipe 404 to a high pressure compressor such as high-pressure compressor 252 of FIG. 2 and FIG. 3. Accordingly, HEX 400 may be in fluid communication via inlet portion 412 with a compressor section 224 of a gas turbine engine. In various embodiments, HEX 400 may be coupled via inlet pipe 404 to a compressor section, combustor section, and/or a turbine section of a gas turbine engine. In various embodiments, HEX 400 may be coupled to any portion of a gas turbine engine.

In various embodiments, HEX 400 may comprise hot air flow path E. Hot air flow path E may be defined by inlet portion 412, plurality of tubes 430, first outlet portion 414, and/or second outlet portion 416. Upon entering inlet portion 412 via inlet pipe 404, air may follow hot air flow path E and enter the plurality of tubes 430 from inlet portion 412 and then exit the plurality of tubes 430 into one of first outlet portion 414 and/or second outlet portion 416. For example, air may enter inlet portion 412, then enter tube 432, next it may exit tube 432 into first outlet portion 414, and finally exit first outlet portion 414 via first outlet pipe 406. In a further example, air may enter inlet portion 412, then enter tube 434, next it may exit tube 434 into second outlet portion 416, and finally exit second outlet portion 416 via second outlet pipe 408. Air exiting either first outlet portion 414 or second outlet portion 416 may be used to cool various portions of a gas turbine engine. In this regard, air flowing through air flow path E may enter HEX 400 via hot-side inlet duct 512 as described in FIG. 5 and may exit HEX 400 via hot-side outlet ducts 514, also as described in FIG. 5. In various embodiments, while in plurality of tubes 430, air in hot air flow path E may transfer heat to air in cooling air flow path F.

In various embodiments, inner surface 454 of shroud 450 may at least partially define a cooling air flow path F. Outer surface 418 of central manifold 410 may at least partially define cooling air flow path F. The outer surface of the plurality of tubes 430 may at least partially define cooling air flow path F. In various embodiments, air from bypass flow path B of FIG. 1 may enter cooling air flow path F. In various embodiments, air in cooling air flow path F may flow generally in an aft direction (positive z-direction). In this regard, air flowing through air flow path F may enter HEX 400 via cold-side inlet 508 as described in FIG. 5 and may exit HEX 400 via cold-side outlet 510, also as described in FIG. 5. In various embodiments, heat from air in the plurality of tubes 430 may be transferred to air in cooling air flow path F. In various embodiments, the transfer of heat may occur in a convective manner. Accordingly, the temperature of air in inlet portion 412 may be greater than the temperature of air in first outlet portion 414 and second outlet portion 416. In various embodiments, the flow of air in plurality of tubes 430 may be orthogonal to the flow of air in cooling air flow path F. Thus, the flow of air in tubes 430 and the flow of air in cooling air flow path F may comprise a cross-flow. Accordingly, plurality of tubes 430 may extend in a direction which is orthogonal to cooling air flow path F.

In various embodiments, a pressure gradient may exist between air in hot air flow path E and cooling air flow path F. In various embodiments, as previously mentioned, inlet portion 412, first outlet portion 414, and second outlet portion 416 may each individually define a cylindrical void as shown in FIG. 4. In various embodiments, air pressure in inlet portion 412 may reach up to 500 pounds per square inch absolute (500 psia) (3,447,378.6 Pascal) or more, while air pressure in cooling air flow path F may generally vary between 14.7 psia (101,352.9 Pascal) and 21 psia (144,789.9 Pascal). In various embodiments, the cylindrical geometry of inlet portion 412, first outlet portion 414, and second outlet portion 416 may be ideal to handle the amount of pressure experienced by these portions. In various embodiments, air entering hot air flow path E may reach temperatures of about 1,400° F. (760° C.) or higher. In various embodiments, with reference to FIG. 3, air entering hot air flow path E may comprise T3 gas. In various embodiments, air entering cooling air flow path F may reach temperatures of about 100° F. (38° C.) or higher. In various embodiments, air entering cooling air flow path F may comprise engine bypass air. In various embodiments, engine bypass air may comprise air from bypass flow path B of FIG. 1.

With reference to FIG. 5, a heat exchanger arrangement 500 installed on an engine case 540 is illustrated, in accordance with various embodiments. In various embodiments, heat exchanger (HEX) 502 may be similar to HEX 400 as illustrated in FIG. 4. In various embodiments, heat exchanger arrangement 500 may include heat exchanger 502, plurality of pipes 506, cold-side inlet 508, cold-side outlet 510, and mounting system 501. Heat exchanger 502 may include first attachment feature 526 and second attachment feature 528. Heat exchanger 502 may further include third attachment feature 530 and fourth attachment feature 532 (not shown in FIG. 5, see FIG. 6A and FIG. 6B). Core engine 120 may include engine case 540. Engine case 540 may include diffuser case 542 and turbine case 546. As described in FIG. 4, fan bypass air may be conducted through cold-side inlet 508 and cold-side outlet 510.

HEX 502 may be located directly radially outward from diffuser case 542. HEX 502 may be located directly radially outward from turbine case 546. HEX 502 may be located axially in line (i.e., in line with respect to the y-direction) with diffuser case 542. HEX 502 may be located axially in line with turbine case 546. HEX 502 may be located axially in line with combustor 256 (see FIG. 2).

Plurality of ducts (also referred to herein as plurality of pipes) 506 may include inlet (also referred to herein as hot-side inlet duct) 512. Plurality of pipes 506 may include plurality of outlet ducts (also referred to herein as plurality of hot-side outlet ducts) 514. Plurality of outlet ducts 514 may include first outlet duct (also referred to herein as hot-side outlet duct) 516 and second outlet duct (also referred to herein as hot-side outlet duct) 518. Plurality of outlet ducts 514 may be coupled to diffuser case 542. Plurality of outlet ducts 514 may be directly coupled to diffuser case 542 as illustrated in FIG. 5. Plurality of outlet ducts 514 may be in fluid communication with compressor section 224 (see FIG. 2).

Figure 6A:
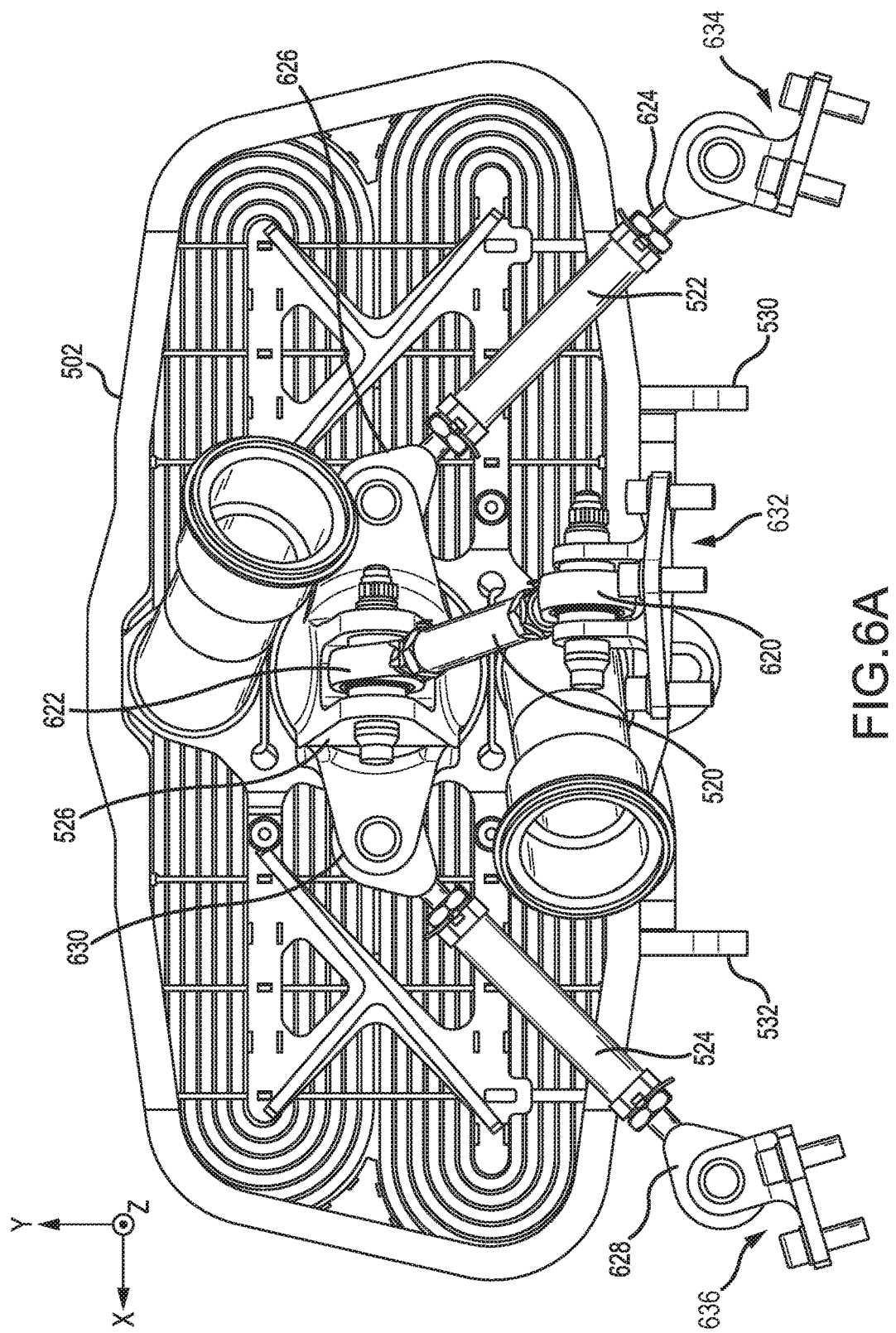
FIG. 6A illustrates a front view of a heat exchanger, in accordance with various embodiments.

In various embodiments, mounting system 501 may comprise a plurality of links (also referred to herein as a plurality of supporting links) including first link 520, second link 522, third link 524, second attachment feature 528, third attachment feature 530, and fourth attachment feature 532 (see FIG. 6A). In various embodiments, mounting system 501 may be for securing heat exchanger 502 to core engine 120. In various embodiments, heat exchanger may be coupled to first link, second link 522, and third link 524 via first attachment feature 526. First link 520 may be coupled between first attachment feature 526 and diffuser case 542. Second link 522 may be coupled between first attachment feature 526 and diffuser case 542. Third link 524 may be coupled between first attachment feature 526 and diffuser case 542.

Figure 6B:
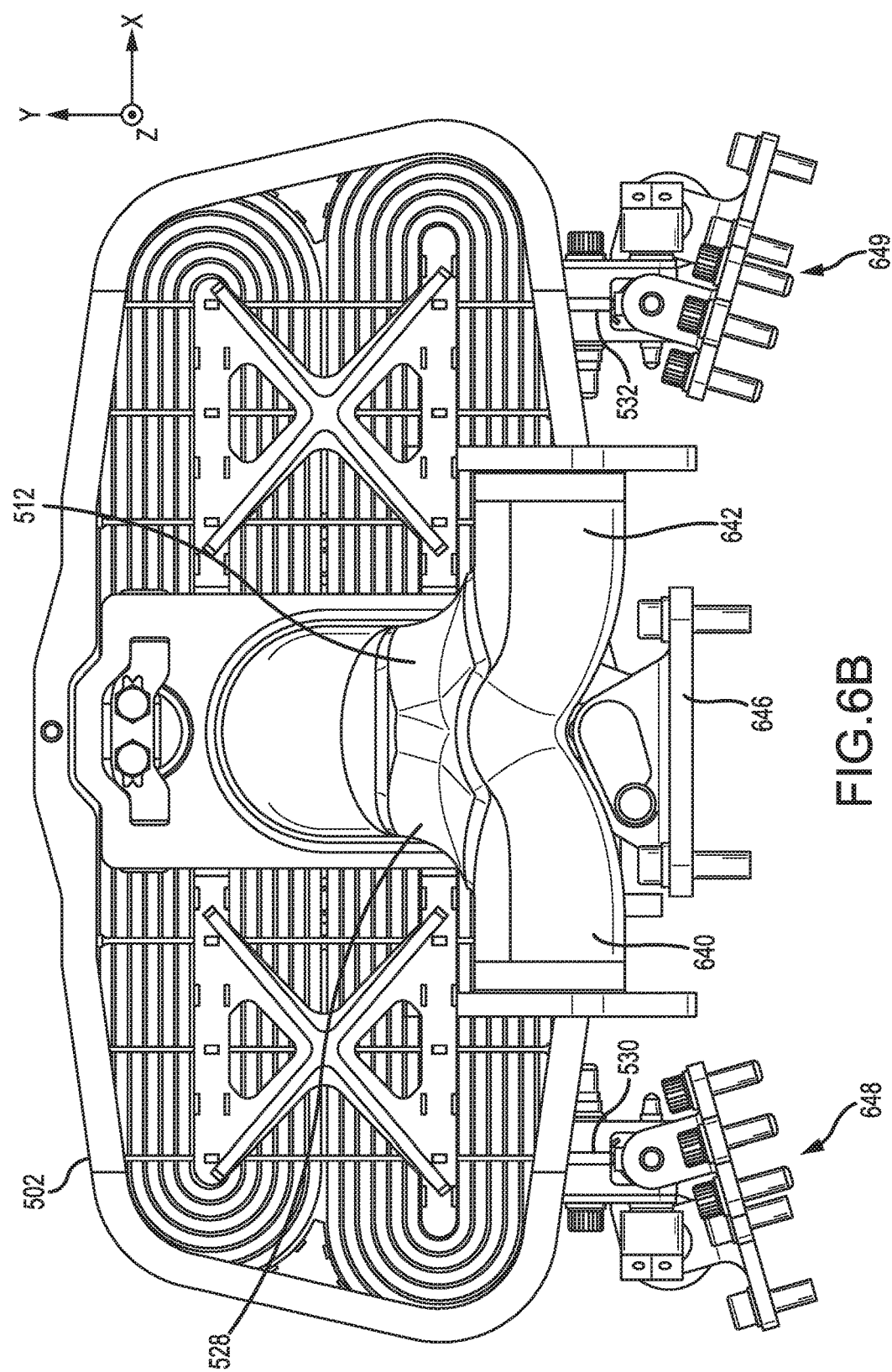
FIG. 6B illustrates an aft view of a heat exchanger, in accordance with various embodiments.

With reference to FIGS. 6A-6B, like element numbering, as depicted in FIG. 5, are intended to be the same and will not necessarily be repeated for the sake of clarity.

With reference to FIG. 6A, a front view of heat exchanger 502 is illustrated, in accordance with various embodiments. First link 520 may extend substantially in an axial direction (i.e., z-direction). First end 620 of first link 520 may be coupled to diffuser case 542 (see FIG. 5). Second end 622 of first link 520 may be coupled to first attachment feature 526. First end 620 of first link 520 may be substantially prevented from moving in a radial direction (i.e., y-direction), with respect to the diffuser case 542. First end 620 of first link 520 may be substantially prevented from moving in an axial direction (i.e., z-direction), with respect to the diffuser case 542. Thus, first end 620 of first link 520 may be substantially prevented from moving in the y-z plane, with respect to the diffuser case 542. However, first end 620 of first link 520 may be free to move in all other linear and rotational directions. In this manner, first attachment feature 526 may be substantially prevented from moving in the axial direction and in the radial direction, with respect to diffuser case 542 (see FIG. 5).

In various embodiments, second link 522 may extend in a circumferential direction (i.e., in the x-y plane). First end 624 of second link 522 may be coupled to diffuser case 542 (see FIG. 5). Second end 626 of second link 522 may be coupled to first attachment feature 526. First end 624 of second link 522 may be substantially prevented from moving in a radial direction (i.e., y-direction), with respect to diffuser case 542. First end 624 of second link 522 may be substantially prevented from moving in a circumferential direction (i.e., x-direction), with respect to the diffuser case 542. Thus, first end 624 of second link 522 may be substantially prevented from moving in the x-y plane, with respect to the diffuser case 542. However, first end 624 of second link 522 may be free to move in all other linear and rotational directions.

Similarly, in various embodiments, third link 524 may extend in a circumferential direction (i.e., in the x-y plane). First end 628 of third link 524 may be coupled to diffuser case 542 (see FIG. 5). Second end 630 of third link 524 may be coupled to first attachment feature 526. First end 628 of third link 524 may be substantially prevented from moving in a radial direction (i.e., y-direction), with respect to diffuser case 542. First end 628 of third link 524 may be substantially prevented from moving in a circumferential direction (i.e., x-direction), with respect to the diffuser case 542. Thus, first end 628 of third link 524 may be substantially prevented from moving in the x-y plane, with respect to the diffuser case 542. However, first end 628 of third link 524 may be free to move in all other linear and rotational directions. In this manner, first attachment feature 526 may be substantially prevented from moving in the radial direction and in the circumferential direction, with respect to diffuser case 542 (see FIG. 5).

In various embodiments, first link 520 may be coupled to core engine 120 (see FIG. 5) via a mounting bracket (also referred to herein as a first mounting bracket) 632. Mounting bracket 632 may be coupled directly to engine case 540 (see FIG. 5). Mounting bracket 632 may be coupled directly to diffuser case 542 or turbine case 546 (see FIG. 5). Similarly, second link 522 may be coupled to core engine 120 (see FIG. 5) via a mounting bracket (also referred to herein as a second mounting bracket) 634. Mounting bracket 634 may be coupled directly to engine case 540 (see FIG. 5). Mounting bracket 634 may be coupled directly to diffuser case 542 or turbine case 546 (see FIG. 5). Similarly, third link 524 may be coupled to core engine 120 (see FIG. 5) via a mounting bracket (also referred to herein as a third mounting bracket) 636. Mounting bracket 636 may be coupled directly to engine case 540 (see FIG. 5). Mounting bracket 636 may be coupled directly to diffuser case 542 or turbine case 546 (see FIG. 5).

With reference to FIG. 6B, an aft view of heat exchanger 502 is illustrated, in accordance with various embodiments. Second attachment feature 528 may be coupled to core engine 120 (see FIG. 5). Second attachment feature 528 may be substantially prevented from moving in a circumferential direction (i.e., x-direction) with respect to diffuser case 542 (see FIG. 5). Second attachment feature 528 may be coupled to core engine 120 (see FIG. 5) via a mounting bracket (also referred to herein as a fourth mounting bracket) 646. Mounting bracket 646 may be coupled directly to engine case 540 (see FIG. 5). Mounting bracket 646 may be coupled directly to diffuser case 542 or turbine case 546 (see FIG. 5).

In various embodiments, third attachment feature 530 may be coupled to core engine 120 (see FIG. 5). Third attachment feature 530 may be coupled to core engine 120 (see FIG. 5) via a mounting bracket (also referred to herein as a fifth mounting bracket) 648. In various embodiments, mounting bracket 648 may be coupled to engine case 540 (see FIG. 5). Mounting bracket 648 may be coupled directly to diffuser case 542 and/or turbine case 546 (see FIG. 5). Third attachment feature 530 may be substantially prevented from moving in a radial direction (i.e., y-direction).

Similarly, fourth attachment feature 532 may be coupled to core engine 120 (see FIG. 5). Fourth attachment feature 532 may be coupled to core engine 120 (see FIG. 5) via a mounting bracket (also referred to herein as a sixth mounting bracket) 649. In various embodiments, mounting bracket 649 may be coupled to engine case 540 (see FIG. 5). Mounting bracket 649 may be coupled directly to diffuser case 542 and/or turbine case 546 (see FIG. 5). Fourth attachment feature 532 may be substantially prevented from moving in a radial direction (i.e., y-direction).

In various embodiments, inlet 512 may comprise a plurality of inlet pipes including first inlet pipe 640 and second inlet pipe 642.

Figure 7:
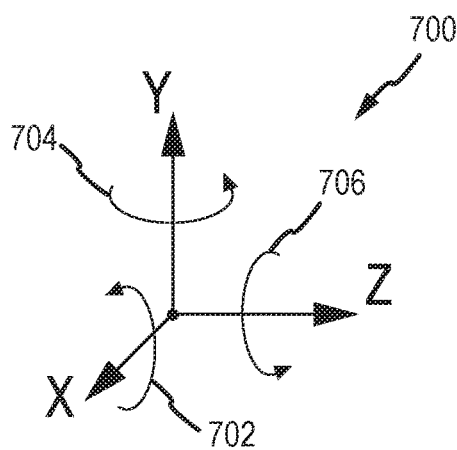
FIG. 7 illustrates an xyz-axis illustrating six degrees of freedom, in accordance with various embodiments.

With reference to FIG. 7, an illustration of six degrees of freedom is provided, in accordance with various embodiments. In various embodiments, the heat exchanger arrangement and/or the mounting system, as disclosed herein, may comprise a statically determined system and more specifically, a statically determined six degrees of freedom system. Xyz-axis 700 is provided for illustration purposes. For example, a system may be capable of moving in 6 directions; three linear direction and three rotational directions. Thus, a system may be capable of moving in the x-direction, the y-direction, the z-direction, the rotational direction 702 about the x-axis, the rotational direction 704 about the y-axis, and the rotational direction 706 about the z-axis. Such a system may be fixed in a manner as to provide a means of limiting the movement of said system. As disclosed herein, six mounting points for a heat exchanger are provided to prevent movement of said heat exchanger in each of the six degrees of freedom. Stated another way, a heat exchanger is provided having a mounting system which is statically determined in each of the six degrees of freedom.

With reference to FIG. 6A and FIG. 6B, HEX 502 may be statically determined in the x-direction via first attachment feature 526 and second link 522 and third link 524. HEX 502 may be statically determined in the y-direction via third attachment feature 530 and fourth attachment feature 532. HEX 502 may be statically determined in the z-direction via first attachment feature 526 and first link 520. HEX 502 may be statically determined in the rotational direction about the x-axis via first attachment feature 526 and second attachment feature 528. HEX 502 may be statically determined in the rotational direction about the y-axis via first attachment feature 526 and second attachment feature 528. HEX 502 may be statically determined in the rotational direction about the z-axis via third attachment feature 530 and fourth attachment feature 532. In this manner, mounting system 501 (see FIG. 5) may be a statically determined six degrees of freedom system.

An over-determined system may be a system having more than one means of limiting a systems movement in a single direction. The heat exchanger arrangement as disclosed herein may be arranged as to prevent an over-determined system to allow for thermal growth during operation.

With reference to FIG. 5, first link 520 may comprise a single vector load path. Stated another way, first link 520 may be configured to transfer loads between heat exchanger 502 and engine case 520 only under compression or tension.

In various embodiments, plurality of pipes 506 may contain pressurized air. Said pressurized air may cause a load on plurality of pipes 506. Said load may be conducted between HEX 502 and engine case 540 via plurality of pipes 506 and via mounting system 501.

Figure 8:
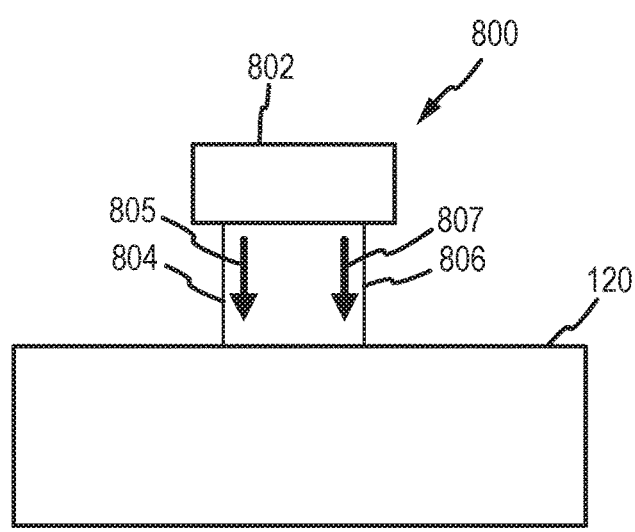
FIG. 8 illustrates a heat exchanger arrangement coupled to a gas turbine engine, in accordance with various embodiments.

With reference to FIG. 8, a heat exchanger arrangement 800 is provided, in accordance with various embodiments. Heat exchanger arrangement 800 may be similar to heat exchanger arrangement 500 (see FIG. 5). Heat exchanger arrangement 800 may include heat exchanger (HEX) 802, plurality of links 804 and plurality of pipes 806. Heat exchanger 802 may be coupled to core engine 120 via plurality of links 804 and plurality of pipes 806. A first load 805 may be transferred between HEX 802 and core engine 120 via plurality of links 804. A second load 807 may be transferred between HEX 802 and core engine 120 via plurality of pipes 806. The magnitude of the first load 805 and the magnitude of the second load 807 may be determined by the stiffness of plurality of links 804 and by the stiffness of plurality of pipes 806. For example, the stiffness of plurality of pipes 806 may be decreased which may decrease the magnitude of second load 807. Stated another way, the stiffness of plurality of links 804 may be increased, which may increase the magnitude of first load 805. Thus, the relative magnitudes of first load 805 and second load 807 may be varied depending on the stiffness of the plurality of links 804 and the plurality of pipes 806. Similarly, the format in which the plurality of links 804 is arranged may effectively vary their stiffness. The pipe-to-linkage spring rate ratio may be the ratio of the effective stiffness of the plurality of pipes 806 and the effective stiffness of the plurality of links 804. Thus, a spring rate ratio (also referred to herein as a pipe-to-linkage spring rate ratio) may exist between plurality of links 804 and plurality of pipes 806. The pipe-tolinkage spring rate ratio may be the ratio of the total load conducted via the plurality of pipes 806 ($L_P$) and the total load conducted via the plurality of links 804 ($L_L$). For example, if one tenth of the total load between HEX 802 and engine case 540 was conducted via the plurality of pipes 806, then nine tenths of the load between HEX 802 and engine case 540 would be conducted via the plurality of links, and the pipe-to-linkage spring rate ratio may be one ninth. Stated another way, if ten pounds of force between HEX 802 and engine case 540 was conducted via the plurality of pipes 806, and ninety pounds of force between HEX 802 and engine case 540 was conducted via the plurality of links, then the pipe-to-linkage spring rate ratio may be ten divided by ninety or one ninth or 11.11%. Stated another way, the pipe-to-linkage spring rate ratio ($SRR_{PL}$) may be determined by equation 1:

$$SRR_{PL}=L_P/L_L$$

In various embodiments, the spring rate ratio between the plurality of pipes 806 and the plurality of links may be between 1% and 30%. In various embodiments, the spring rate ratio between the plurality of pipes 806 and the plurality of links may be between 5% and 20%. In various embodiments, the spring rate ratio between the plurality of pipes 806 and the plurality of links may be between 5% and 15%. In various embodiments, the spring rate ratio between the plurality of pipes 806 and the plurality of links may be about 10%, wherein the term "about", in this context only, only means±3%.

Figure 9A:
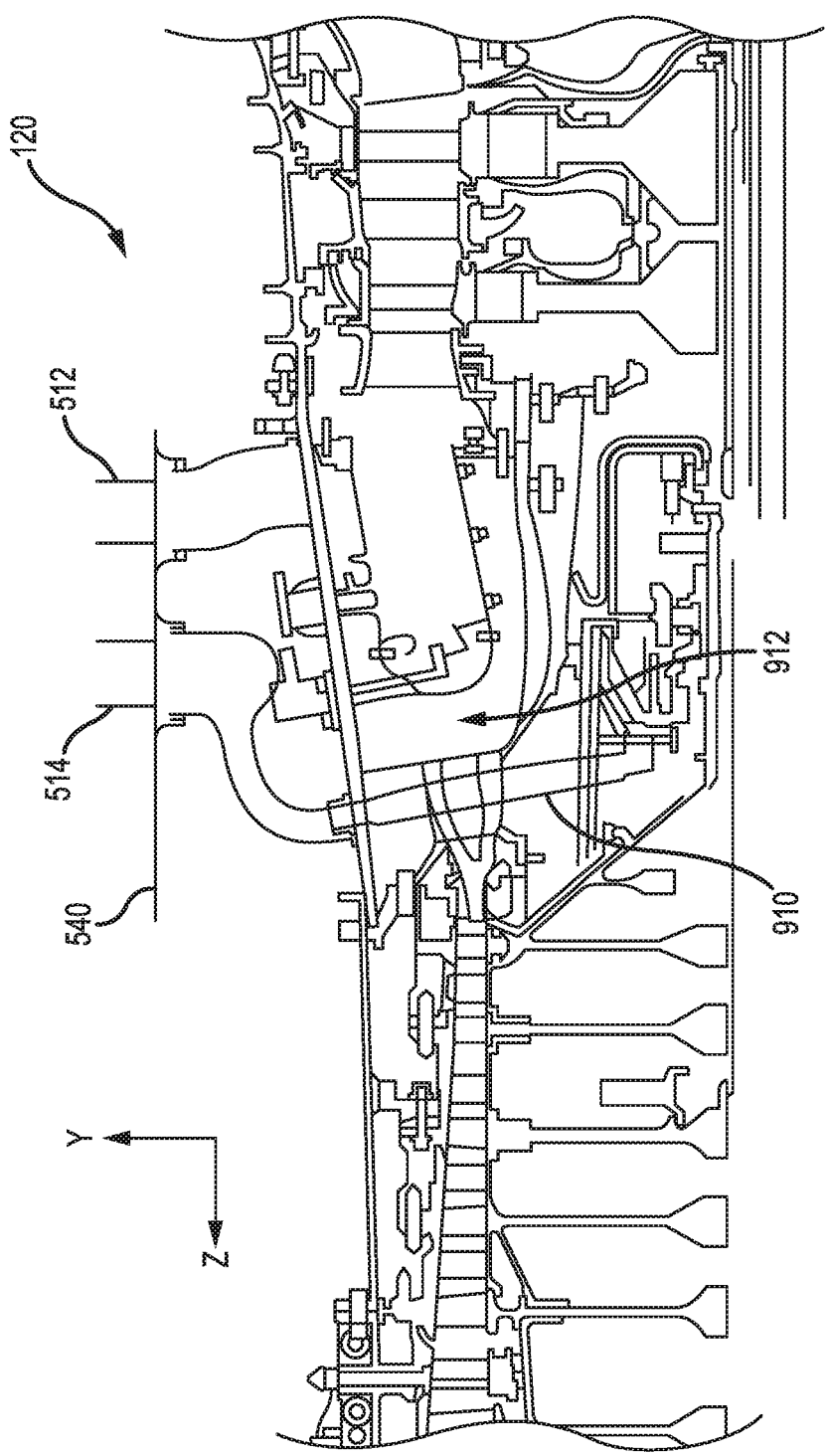
FIG. 9A illustrates a cross-sectional view of an exemplary gas turbine engine having a hollow strut, in accordance with various embodiments.

With reference to FIG. 9A, a cross section view of a gas turbine engine 120 is illustrated, in accordance with various embodiments. In various embodiments, outlet ducts 514 may be in fluidic communication with hollow strut 910. Hollow strut 910 may extend within plenum (also referred to herein as diffuser case plenum) 912. Cooled air may be conducted through outlet ducts 514 and into hollow strut 910. Hollow strut 910 may extend between engine case 540 and engine axis A-A' (see FIG. 2). Inlet 512 may be directly coupled to engine case 540. Inlet 512 may receive air from plenum 912.

Figure 9B:
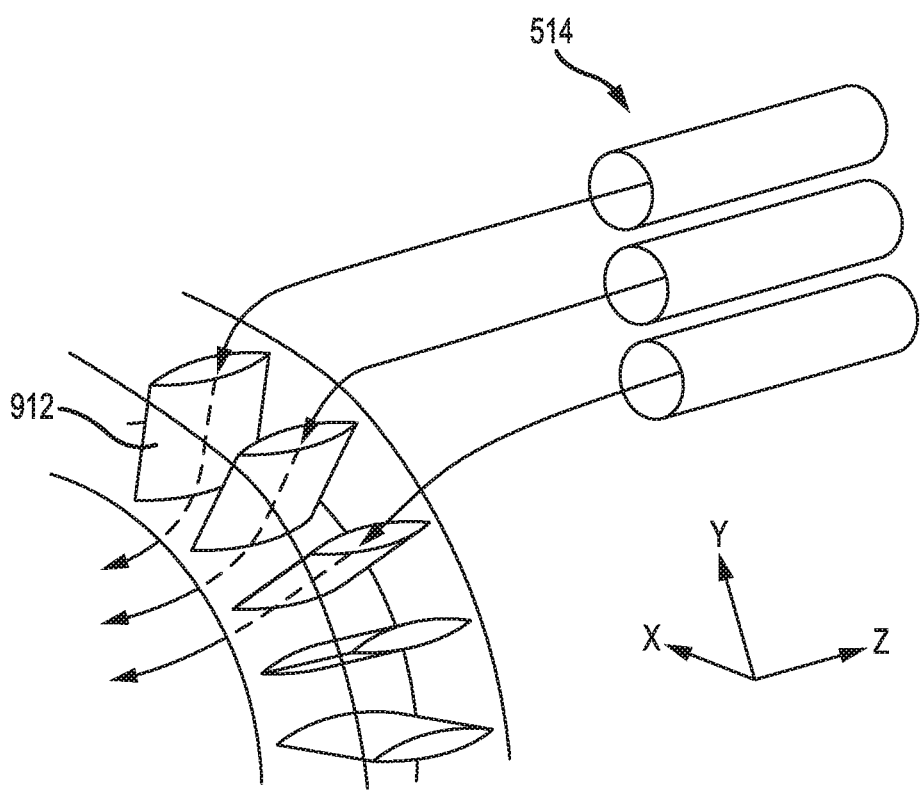
FIG. 9B illustrates a perspective view of heat exchanger outlet ducts in fluidic communication with a plurality of hollow struts, in accordance with various embodiments.

With reference to FIG. 9B, a perspective view of outlet ducts 514 in fluidic communication with a plurality of hollow struts including hollow strut 912 is illustrated, in accordance with various embodiments. As illustrated in FIG. 9B, a plurality of hollow struts may be arranged about an engine axis. Each outlet duct included in plurality of outlet ducts 514 may be in fluidic communication with a separate hollow strut 912. However, in various embodiments, outlet ducts 514 may be in fluidic communication with one or more hollow struts.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat exchanger for cooling air in a gas turbine engine, comprising:
   a plurality of ducts comprising:
      a hot-side inlet duct;
      a hot-side outlet duct in fluid communication with a compressor section of the gas turbine engine and in mechanical communication with a diffuser case; and
   a plurality of supporting links coupled between the heat exchanger and an engine case for securing the heat exchanger relative to the gas turbine engine, wherein a spring rate ratio between the plurality of ducts and the plurality of supporting links is between 1% and 30%;
   wherein the hot-side outlet duct is directly coupled to the diffuser case;
   wherein the heat exchanger comprises a first connector, the plurality of supporting links comprising a first link coupled to the first connector, a second link coupled to the first connector, and a third link coupled to the first connector;
   wherein the first link extends in an axial direction, a first end of the first link coupled to the diffuser case and a second end of the first link coupled to the first connector, wherein the first end of the first link is prevented from moving in a radial direction and prevented from moving in the axial direction;
   wherein the second link extends in a circumferential direction, a first end of the second link coupled to the diffuser case and a second end of the second link coupled to the first connector, wherein the first end of the second link is prevented from moving in a radial direction and is prevented from moving in the circumferential direction, with respect to the diffuser case; and wherein the third link extends in the circumferential direction, a first end of the third link coupled to the diffuser case and a second end of the third link coupled to the first connector, wherein the first end of the third link is prevented from moving in the radial direction and is prevented from moving in the circumferential direction, with respect to the diffuser case.

2. The heat exchanger of claim 1, wherein the first connector is prevented from moving in the axial direction and in the radial direction, with respect to the diffuser case.

3. The heat exchanger of claim 1, wherein the first connector is prevented from moving in the radial direction and in the circumferential direction, with respect to the diffuser case.

4. The heat exchanger of claim 1, wherein the heat exchanger comprises a second connector, the second connector coupled to the gas turbine engine, the second connector prevented from moving in a circumferential direction with respect to the gas turbine engine.

5. The heat exchanger of claim 4, wherein the second connector is coupled to the gas turbine engine via a mounting bracket coupled directly to an engine case.

6. The heat exchanger of claim 1, wherein the heat exchanger comprises a third connector coupled to the gas turbine engine and a fourth connector coupled to the gas turbine engine, wherein the third connector is prevented from moving in a radial direction and the fourth connector is prevented from moving in the radial direction.

7. The heat exchanger of claim 6, wherein the third connector is coupled to the gas turbine engine via a fifth mounting bracket coupled directly to the diffuser case and the fourth connector is coupled to the gas turbine engine via a sixth mounting bracket coupled directly to the diffuser case.

8. The heat exchanger of claim 1, wherein the heat exchanger comprises a cold-side inlet and a cold-side outlet through which fan bypass air is conducted.

* * * * *

UNITED STATES PATENT AND TRADEMARK OFFICE
CERTIFICATE OF CORRECTION

PATENT NO. : 10,151,247 B2
APPLICATION NO. : 15/074829
DATED : December 11, 2018
INVENTOR(S) : Paul W Duesler and Fredrick M Schwarz It is certified that error appears in the above-identified patent and that said Letters Patent is hereby corrected as shown below:

In the Specification

In Column 1 Line 6 please delete "FA8650-09-D2923-AETD" and therefore insert -- FA8650-09-D2923-0021 --

Signed and Sealed this
Sixteenth Day of April, 2019

Andrei Iancu
*Director of the United States Patent and Trademark Office*